A. C. JOHNSON.
TRACTOR.
APPLICATION FILED FEB. 2, 1914.
1,198,849.
Patented Sept. 19, 1916.
2 SHEETS—SHEET 1.
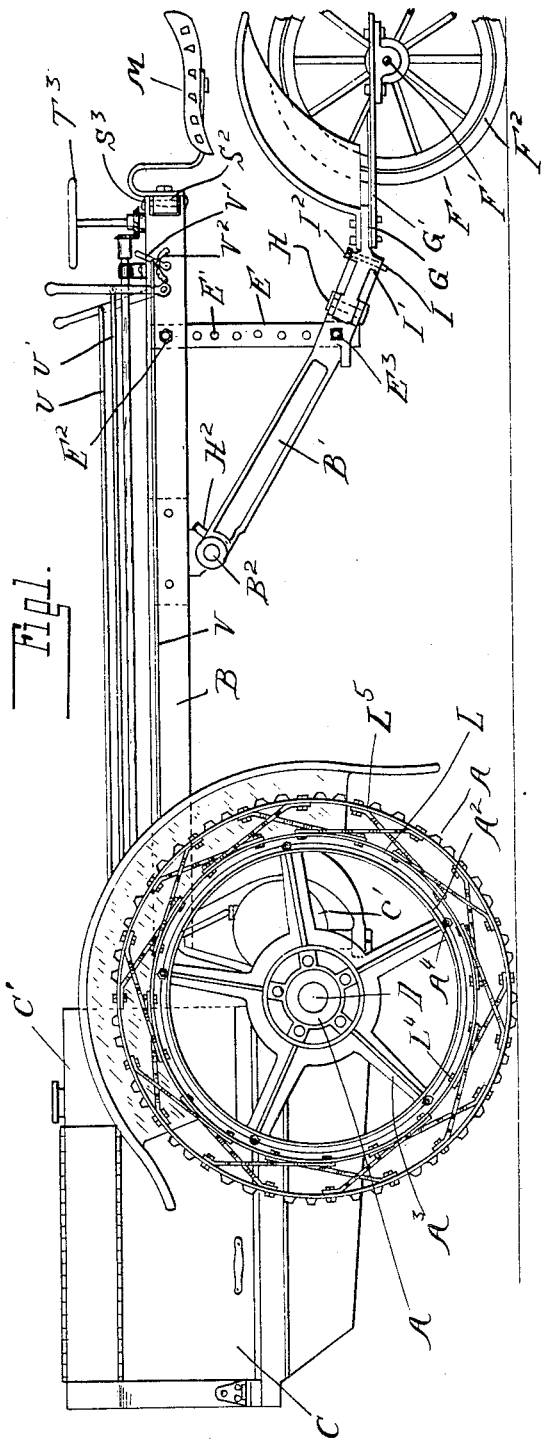
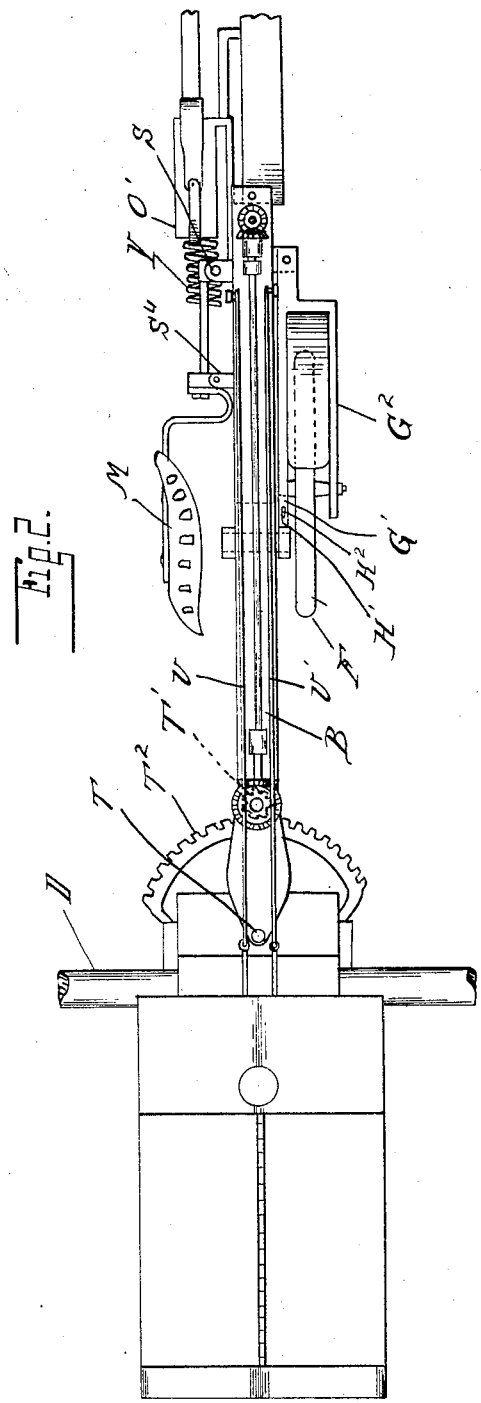
Witnesses
W. F. Frail
C. B. Belknap
Inventor
Alfred C. Johnson
By Whittemore Hulbert & Whittemore
Attys A. C. JOHNSON.
TRACTOR.
APPLICATION FILED FEB. 2, 1914.
1,198,849.
Patented Sept. 19, 1916.
2 SHEETS—SHEET 2.
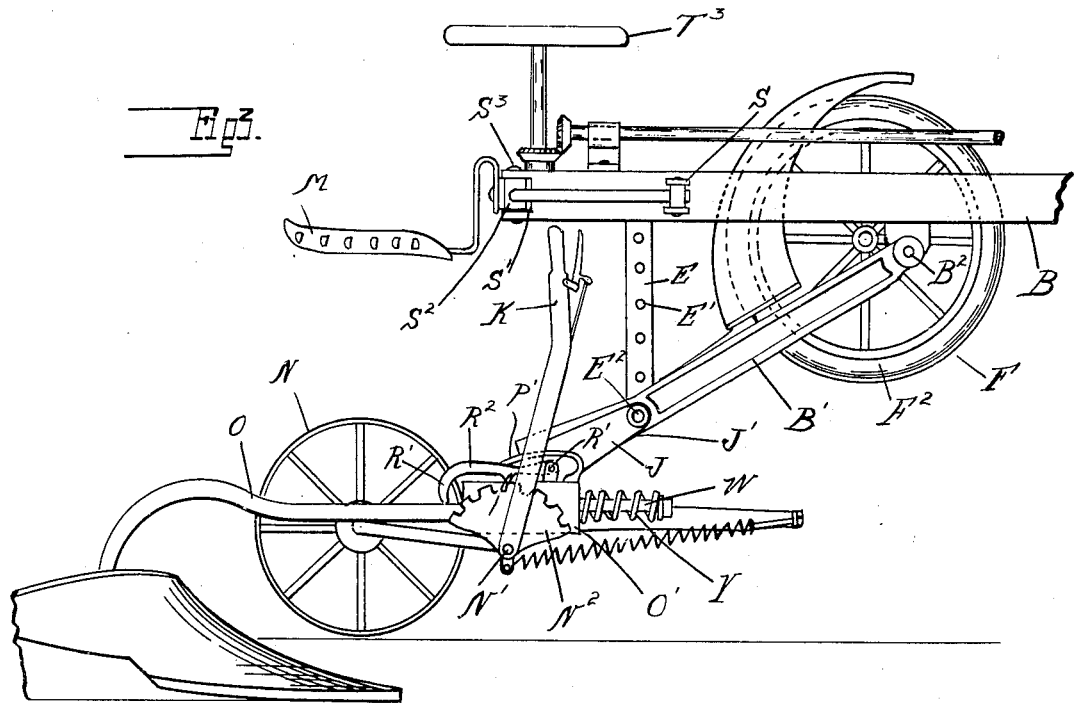
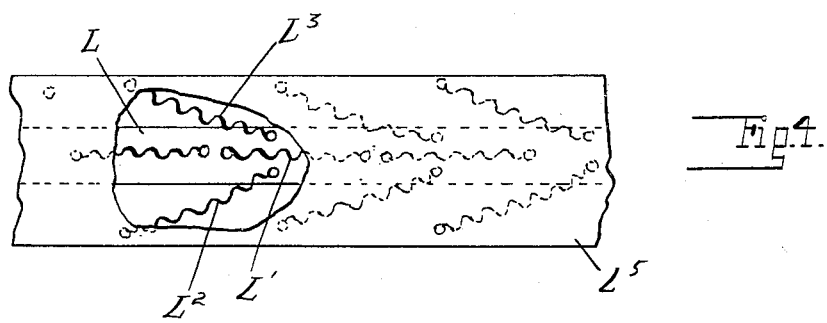
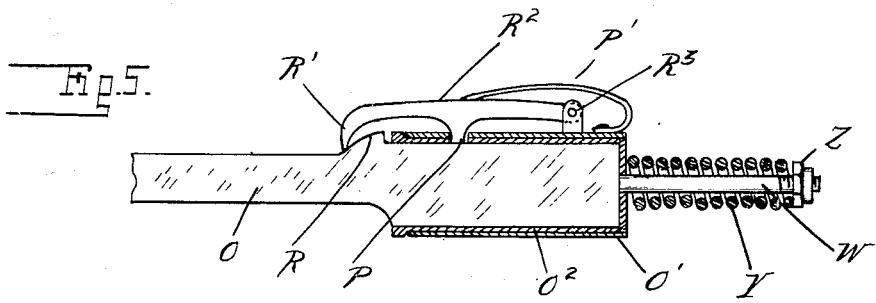
Witnesses
W. K. Ford
C. B. Belknap
Inventor
Alfred C. Johnson
By Whittemore Hulbert & Whittemore
Atty's

UNITED STATES PATENT OFFICE.

ALFRED C. JOHNSON, OF WINTERS, CALIFORNIA, ASSIGNOR, BY MESNE ASSIGNMENT, TO THE YUBA CONSTRUCTION COMPANY, OF SAN FRANCISCO, CALIFORNIA, A CORPORATION OF CALIFORNIA.

TRACTOR.

1,198,849.  Specification of Letters Patent.  Patented Sept. 19, 1916.

Application filed February 2, 1914. Serial No. 816,034.

*To all whom it may concern:*

Be it known that I, ALFRED C. JOHNSON, a citizen of the United States of America, residing at Winters, in the county of Yolo and State of California, have invented certain new and useful Improvements in Tractors, of which the following is a specification, reference being had therein to the accompanying drawings.

This invention relates to tractors and more particularly to a light tractor adapted for general farm use.

One of the objects of the invention is to provide a machine of the type mentioned which, together with the plow or other implement connected thereto, can be controlled and adjusted by the driver from the tractor seat.

Among other objects of the invention are to so construct the tractor that it may be employed interchangeably with various farm implements of standard construction; to provide wheels which will properly cushion the mechanism when the tractor is driven over hard roads; and to provide for the convenient adjustment of the rear wheels and the tractor seat to inoperative positions.

The invention further resides in the improved and compact arrangement of parts and in various features of construction as hereinafter described.

In the drawings, Figure 1 is a side elevation showing the rear road wheel in use; Fig. 2 is a plan view showing the rear road wheel and seat rocked forward; Fig. 3 is a side elevation of the rear portion of the tractor showing a plow attached; Fig. 4 is a fragmentary plan view looking down on a section of one of the drive wheels; and Fig. 5 is a section through the automatic release for the plow.

In the construction shown in the drawings the front wheels A mounted upon the axle D constitute the drive wheels, and the main frame of the tractor extends rearwardly therefrom. The axle D is employed as the drive axle and is driven from the engine (not shown) within the casing C by a suitable transmission (not shown) housed within the transmission casing C'. While the engine and transmission cases are mounted upon the front axle, they are so arranged with reference to the main frame that the preponderance of weight of the tractor as a whole is slightly in rear of the front axle.

The rear portion of the main frame B is supported by a sub-frame B' secured at one end to the main frame by a pivotal connection $B^2$. The sub-frame extends diagonally downward from the main frame and has its lower end adjustably spaced therefrom by a bar E. A plurality of apertures $E'$ are provided in the spacer bar E, these apertures being engaged by bolts $E^2$ and $E^3$ which pass through apertures in the main frame and sub-frame respectively. The rear end of the main frame is raised or lowered according to which apertures in the bar E are engaged by the bolts $E^2$ and $E^3$.

In general farm use it is often necessary that the tractor travel over hard or rough roads, and the usual lack of cushioning means in tractor constructions makes such travel both inconvenient for the driver and detrimental to the tractor mechanism. This objection has been overcome in the present construction by an arrangement of spring mounting which will not interfere with the normal use of the tractor for heavy work. In detail the drive wheels A as shown comprise the hub portion $A'$ and the inner rim member $A^2$ between which a plurality of spokes $A^3$ extend. A demountable rim L is adapted to fit over the inner rim member $A^2$ and is detachably secured thereto by bolts $A^4$. A plurality of spring members are secured to the outer face of the demountable rim and extend tangentially therefrom. One end of these springs is secured by rivets or like securing means $L^4$ to the demountable rim L, the opposite end of the springs being secured in a similar manner to the ground-engaging tread member $L^5$ which surrounds but is spaced from the demountable rim L.

While the demountable rim arrangement will permit of the removal of the spring tread and the substitution of a solid drive wheel, I preferably employ the same tread for the drive wheel for both road travel and heavy work. As shown in Fig. 4, the springs $L'$ $L^2$ and $L^3$ are arranged in series around the wheel, the series of the spring $L'$ extending tangentially from the central portion of the demountable rim to the central portion of the tread. The springs $L^2$ and $L^3$ are arranged in pairs, a series of these pairs being distributed around the periphery of the demountable rim and extending tangentially therefrom in the reverse direction from the springs L' so that the planes of the springs cross, as shown in Fig. 1. The inner ends of the springs L² and L³ are secured to the demountable rim upon opposite sides of the spring L' and at points intermediate the ends of the latter springs. A similar break-joint arrangement is maintained with reference to the points of securement of the outer ends of the springs, and as the tread member L⁵ is of greater width than the demountable rim, the pairs of springs L² and L³ extend laterally also in a diagonal direction. This arrangement tends to prevent relative lateral movement between the tread proper and the remainder of the wheel, and the spring arrangement as an entirety is such as to sufficiently cushion the forward part of the tractor for road use without sacrificing the strength necessary for tractor purposes. Provision is also made for resiliently supporting the rear end of the tractor and I preferably employ a rear road wheel which may be moved to a position where it will not interfere with the attachment and operation of the plow or the like. This rear road wheel F is mounted in bearings F' carried by the arms G' and G² on the bifurcated frame G. The arms G' and G² preferably serve as leaf springs, while the wheel F is further cushioned by a tire F² of rubber or the like. The forward end of the frame G is pivotally connected at H to the sub-frame B' and is rockable forward about the pivot H to the position shown in Fig. 2, where it may be locked by engaging an aperture H' in the arm G' with a pin H² positioned at the upper end of the sub-frame B'. Means are also provided for securing the wheel F in its ground-engaging position. Thus the wheel frame G has a bearing portion I adapted to fit within a bearing portion I' at the extreme lower end of the sub-frame B' and when engaged with each other these bearings are locked by a pin I² extending through registering apertures in their respective bearings.

Upon its opposite side the sub-frame B' is provided at its lower end with a bearing portion J to which the frame J' of the plow or other implement may be attached. By securing the rear road wheel F in its forward position and securing the plow to the bearing portion J of the sub-frame B', the plow is arranged sufficiently forward to properly position its operating lever K for convenient operation from the driver's seat M. In this position of the parts the rear end of the tractor is supported by the plow wheel N and the depth of the plowshare below the surface can therefore, be regulated in the usual manner by rocking the plow wheel N about the pivot N' and securing it in its various positions of adjustment by engagement of the locking dog with the segment N².

Provision is made for guarding against injury to the tractor through excessive strains arising from the plowshares striking stones, stumps or the like. As shown in detail in Fig. 5, the plow-beam O has slidably sleeved upon its forward end an inner bearing member O². A bolt W secured to the forward end of the plow-beam projects through an aperture in the forward end of the bearing O² and a heavy spring Y is sleeved upon the bolt W and has its opposite ends bearing against the inner bearing member O² and an adjustable nut Z on the end of the bolt. This spring is sufficiently heavy to normally prevent any large relative movement between the plow-beam O and the inner bearing member O². This latter-mentioned member is adapted to extend within an outer bearing member O' carried by the frame J'. A lever R² is pivoted at R³ to the outer bearing member O' and carries a locking dog P extending through registering apertures in the bearings O' and O² normally locking the same from relative movement. When, however, the spring Y is placed under abnormal compression, it will permit sufficient relative movement between the beam O and the inner bearing O² to cause the cam surface R to raise the lever R² through the lug R' to release the dog P from the inner bearing member O². This will result in releasing the plow or other member secured to the beam O and will prevent injury to the tractor.

The amount of pull necessary to compress the spring Y can be controlled by adjusting the nut Z either toward or from the bearing O'. Various farm implements may be provided with securing portions having the cam surfaces R and the inner bearing member O², so that they may be used interchangeably with the frame J', or other forms of riding plows may be directly attached to the bearing J. In case, however, a plow or other implement is attached which carries its own seat, provision is made for rocking the seat M to an inoperative position. Normally the seat M extends rearward from a swivel S which connects it at its forward end to the frame B. The rear end of the main frame B is provided with a bearing portion S' which is engaged by a bearing S² on the plow-seat frame, these bearings in their engaged position having registering apertures through which a bolt or other securing member S³ extends. When it is desired to move the seat M to an inoperative position, it is rocked forward and simultaneously turned sidewise about the swivel S and is locked in its forward position by a pin or other suitable means to the bearing S⁴ carried by the main frame. The arrangement of parts is such that whether the seat M is employed or that of the plow or other implement, the seat would be positioned so that the operating lever K of the plow can be conveniently operated by the driver and also the steering wheel and control levers for governing the tractor.

The tractor is preferably steered by turning the front axle and its wheels relative to the main frame about a pivotal point T. A pinion T' journaled in the frame engages the segment T² carried by the front axle portion of the tractor and through a suitable train of gears is operatively connected to the steering wheel T³ positioned at the rear end of the frame. A clutch lever U and a gear-shifting lever U' are also positioned at the rear portion of the frame B in operative relation to the seat M and extend forward to the engine and transmission casing passing through a point at substantially the pivot point T and being provided with ball and socket joints, whereby the turning of the front axle around the pivot T will not materially affect their adjustment. A flexible wire throttle control V also extends from the engine to the rear portion of the frame B, where it is operated by a lever V' engaging the notched ratchet V². As is the case with the clutch and gear-shifting levers, the throttle control passes through substantially the pivotal point T so that the relative adjustment of the front axle and the frame does not materially affect its adjustment.

The arrangement of the lever controls at the rear of the tractor with the rear road wheel and the seat both adapted to be secured in either operative or inoperative positions of adjustment, permits of the tractor being employed with a large field of farm implements of standard construction, without materially altering the same.

While I have shown and described a tractor having three wheels, it is obvious that my invention may be applied to tractors of various constructions or number of wheels, without departing from the scope of my invention, and although the tractor is particularly adapted for use in connection with plows, I do not desire to limit my invention to its employment to any particular implement or use.

What I claim as my invention is:—

1. The combination with a tractor frame, comprising a main frame and an adjustable sub-frame, of drive wheels supporting the forward part of said main frame, a road wheel pivotally connected to and supporting the sub-frame, and a seat pivotally connected to the rear portion of said main frame, said seat and road wheel being independently rockable forward to inoperative positions.

2. The combination with a tractor frame, comprising a main frame and an adjustable sub-frame extending diagonally downward from the main frame, drive wheels supporting the forward end of the main frame, a seat mounted on the rear of said main frame, a road wheel pivotally connected to the sub-frame and rockable forward about its pivot to an inoperative position, said seat being also independently rockable forward to an inoperative position for the purpose described.

3. The combination with a tractor frame, comprising a main frame and a sub-frame extending diagonally downward from the main frame, drive wheels supporting the forward end of the main frame, a seat mounted on the rear of said main frame, and a road wheel pivotally connected to the sub-frame and rockable forward about its pivot to an inoperative position adjacent the main frame.

4. The combination with a tractor frame, of drive wheels supporting the forward end of said frame, and a road-wheel pivotally connected to said frame and rockable forward about its pivot to an inoperative position substantially parallel to the main frame.

In testimony whereof I affix my signature in presence of two witnesses.

ALFRED C. JOHNSON.

Witnesses:
HESTER E. BRUNSON,
GUY V. GIBBS.